United States Patent [19]

Ito et al.

[11] 4,435,512
[45] Mar. 6, 1984

[54] PROCESS FOR PRODUCING CORDIERITE CERAMIC PRODUCTS

[75] Inventors: Kazuyuki Ito, Nishio; Masami Ouki, Nagoya; Naoto Miwa, Tsushima; Osami Kamigaito, Nagoya; Haruo Doi, Nagoya; Yoshiharu Hirose, Nagoya, all of Japan

[73] Assignees: Nippondenso Co., Ltd., Kariya; Kabushiki Kaisha Toyota Chuo Kenkyusho, Nagakute, both of Japan

[21] Appl. No.: 324,571

[22] Filed: Nov. 24, 1981

[30] Foreign Application Priority Data

Nov. 28, 1980 [JP] Japan .................. 55-166643

[51] Int. Cl.³ .................. C04B 35/04; C04B 35/10
[52] U.S. Cl. .................. 501/32; 501/9; 501/118; 501/119; 501/153
[58] Field of Search .................. 501/9, 32, 118, 119, 501/153

[56] References Cited

U.S. PATENT DOCUMENTS 4,001,028 1/1977 Frost et al. .................. 501/118
4,295,892 10/1981 Matsuhisa et al. .................. 501/153
4,300,953 11/1981 Lachman .................. 501/118

Primary Examiner—Mark Bell
Attorney, Agent, or Firm—Cushman, Darby & Cushman

[57] ABSTRACT

A process for producing a cordierite ceramic product comprises blending a starting cordierite composition which comprises:
(a) a clay formulation having a cordierite composition comprising kaolin, talc and aluminium oxide and/or an aluminium compound which is convertible into aluminium oxide;
(b) a glass having a cordierite composition;
(c) an organic binder; and,
(d) water.

3 Claims, 6 Drawing Figures

DIRECTION P

DIRECTION R

DIRECTION L

PROCESS FOR PRODUCING CORDIERITE CERAMIC PRODUCTS

TECHNICAL FIELD

The present invention relates to a process for producing a cordierite ceramic product, particularly a cordierite ceramic product having a substantially isotropic and low thermal expansion coefficient and, thus, an improved thermal shock resistance. cl BACKGROUND ART A cordierite ($2MgO.2Al_2O_3.5SiO_2$) has a very low expansion coefficient of about $2.5 \times 10^{-6}/°C$. and a high resistance against repeated cycles of heating and cooling and, thus, it is used as a refractory material in electrical heaters, electrical arc resistant porcelain and heating apparatuses employed in the chemical industry, as well as a carrier having a catalyst for purifying the exhaust gas of automobiles, particularly, a monolithic honeycomb carrier having a catalyst (c.f. U.S. Pat. No. 3,885,977). It is necessary for such a catalyst carrier to have particular properties, of which thermal shock resistance is the most important, because a sintered ceramic carrier body is apt to suffer from cracking and destruction due to repeated changes of temperature caused by exothermic catalytic oxidation of hydrocarbons and carbon monoxide remaining in the exhaust and, consequently, thermal stress is generated in the ceramic body. In this case, the thermal shock resistance is expressed in the term of maximum number of repeated cycles of rapid heating and cooling at which a crack or cracks appear on the surface of the ceramic body. This number is clearly related with the thermal expansion coefficient, and the lower the latter, the higher the former. In addition, mechanical vibration resistance is another important property for such an oxidation catalyst carrier. A cordierite ceramic product has both a high thermal shock resistance and a high vibration resistance; therefore, it is commonly used as a monolithic honeycomb carrier for an oxidation catalyst. Generally, a cordierite ceramic body is produced as follows. A clay formulation comprising talc, kaolin and aluminium oxide, is extruded to form a monolithic honeycomb, which is, then, dried and sintered. In this case, planar crystallines of talc are oriented in the direction of extrusion, and the thermal expansion coefficient of the cordierite sintered ceramic is lower in the direction of extrusion than in the direction of the thickness of the planar crystallines, i.e., in the direction rectangular to the direction of extrusion. The anisotropic expansion of the sintered body accelerates the occurrence of thermal stress due to the changes of temperature, and, if the stress exceeds the critical strength of the crystallines or the grain boundaries, very fine cracks appear in the crystallines or in the grain boundaries and, thus, the cordierite ceramic body deteriorates in its mechanical strength, thermal shock resistance and durability. Such cracks occur not only by the above-mentioned anisotropic thermal expansion, but also by volumetric contraction during the sintering of green clay material, which usually comprises hydrated crystals, such as aluminium hydroxide.

It is known that an amount of calcined clay is added to the starting clay in order to lower the rate of contraction. However, the more calcined clay added, the higher the thermal expansion coefficient and, thus, the lower the thermal shock resistance.

It is also known, that cordierite ceramic is produced from glass having a cordierite composition. A formulation of a cordierite composition comprising $SiO_2$, $Al_2O_3$ and MgO is fused to form a glass mass, which is ground, moulded after being mixed with a binder, dried and sintered to form a cordierite ceramic body. The resulting cordierite ceramic has a very low rate of contraction, a low thermal expansion coefficient and an isotropic crystalline orientation. However, it is necessary to use a large amount of binder, compared with the clay mineral to be moulded.

DISCLOSURE OF THE INVENTION

It is an object of the present invention to provide a process for producing a cordierite ceramic product having a substantially isotropic and low thermal expansion coefficient.

It is another object of the present invention to provide a process for producing a cordierite ceramic product having an improved thermal shock resistance, particularly, a durable thermal shock resistance.

It is yet another object of the present invention to provide a process for producing a cordierite ceramic product having an improved thermal shock resistance in a simpler and easier operation.

It is still another object of the present invention to provide a process for producing a monolithic honeycomb ceramic carrier having a catalyst for purifying the exhaust of automobiles, which carrier has an improved durability against repeated thermal shocks.

Other objects and advantages of the present invention will further become apparent from the following description.

There is provided, according to the present invention, a process for producing a cordierite ceramic product comprising the steps of blending the starting cordierite composition, moulding the blended composition, and drying and sintering the moulded composition, characterized in that said starting cordierite composition comprises:

(a) a clay formulation having a cordierite composition comprising kaolin, talc and aluminium oxide and/or an aluminium compound which is convertible into aluminium oxide;
(b) a glass having a cordierite composition;
(c) an organic binder; and
(d) water.

It is desirable that the component (b), glass, be from 10 to 90% by weight, based on the total weight of the components (a) and (b), in order to obtain a substantially isotropic and low thermal expansion coefficient.

It is preferable that the component (b), glass, be from 30 to 70% by weight, based on the total weight of the components (a) and (b), in order to obtain further an improved thermal shock resistance.

It is advisable that the component (c), organic binder, be from 3 to 8% by weight, and that the component (d), water, be from 18 to 23% by weight, both based on the total weight of said starting cordierite composition of (a), (b), (c) and (d).

It is advantageous that the expansion coefficient of said cordierite ceramic product is less than $1.2 \times 10^{-6}/°C$. on the average as measured at different temperatures falling within the range of from 25° to 1,000° C. and the difference between those measured in three directions which are rectangular to each other is less than $0.2 \times 10^{-6}/°C$., one of said directions being that of extrusion or injection.

It is convenient that said cordierite ceramic product has a monolithic honeycomb structure.

If the composition (b), glass, is less than 10% by weight, based on the total weight of the components (a) and (b), the rate of contraction during the sintering is more than about 4% and the yield of ceramic product is less than about 80%. If the component (b), glass, is more than 90% by weight, based on the total weight of the components (a) and (b), the whole surface of the green body peels off.

If the amount of an organic binder is less than 3% by weight, based on the weight of the starting composition of (a), (b), (c) and (d), a part or the whole surface of the green body peels off. The more the organic binder used, the better the mouldability. However, if the amount of the binder is more than 8% by weight, based on the total weight of the starting composition, the sintered ceramic product becomes too porous. If the amount of water is less than 18% by weight, based on the total weight of the starting composition, the green body is too crumbly to freely flow through an extrusion die. If the amount of water is more than 23% by weight, based on the total weight of the starting composition, the green body is too loose to maintain its moulded shape.

Appropriate extrusion aids may be used in addition to the organic binder and water.

The steps of blending, moulding, drying and sintering may be carried out using various technics known in the art. The powdered cordierite composition may be blended with the binder and water in a kneader or a Banbury mixer. The blended material may be moulded by extrusion or injection to form a honeycomb, a solid cylinder or any other desired shapes. Thus, the formed green body is dried at about 120° C. for 30 minutes and sintered at a temperature from about 1,370° to about 1,460° C. for from about 5 to about 100 hours, preferably from about 5 to about 10 hours in order to save the cost of fuel.

The present invention secures the advantages of cordierite glass in mixing it to the conventional cordierite-forming clay formulation. The advantages of cordierite glass reside in the isotropic orientation of crystallines, a very low rate of contraction during the sintering and a low thermal expansion coefficient which is practically equal in three directions, which are rectangular to each other. Furthermore, the present invention avoids the disadvantage of cordierite glass, such as unfavourable mouldability.

The above-mentioned advantages will be illustrated more in detail hereinafter. The cordierite glass (b) is inherently isotropic, and begins to crystallize at about 1,000° C. Cordierite-forming clay formulation (a) converts into a crystalline cordierite at about 1,370° C. The cordierite composition, as a whole, is sintered at from about 1,370° to about 1,460° C. Thus, the cordierite-forming clay (a) converts into an unoriented crystalline state influenced by the isotropic cordierite glass (b). The expansion coefficient of said cordierite ceramic product is lowered and, in addition, the difference between the expansion coefficients measured in the three directions is reduced. Thus, the cordierite ceramic has a high thermal shock resistance and the thermal stress is low, even if repeated cycles of rapid heating and cooling, as in the purification of exhaust gas, are applied to the ceramic product.

The cordierite glass reduces the rate of contraction and the occurrence of cracks during the sintering and, consequently, the operating conditions for sintering becomes easy, and the production yield is improved. The cordierite glass ceramics has also an increased its density and, thus, the mechanical strength of the cordierite ceramic product is increased as a whole.

It is a matter of course that the cordierite ceramic produced in accordance with the present invention does not deteriorate in its thermal expansion coefficient and thermal shock resistance, as in the case of cordierite ceramic produced by adding calcined cordierite clay in the prior art.

BEST MODE FOR CARRYING OUT THE INVENTION

Figure 1:
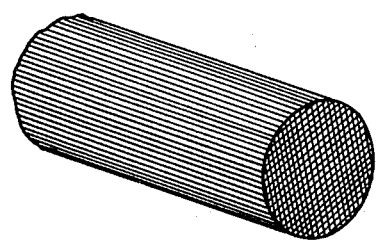
FIG. 1 is a perspective view of a monolithic honeycomb structure.

The present invention will be described in detail referring to the drawings and compared with the prior art.

1. Preparation of Samples 1.1 Preparation of Cordierite-Forming Clay Formulation Kaolin, halloysite from New Zealand, with an average particle diameter of 0.9 μm, talc from the north-east China with an average particle diameter of 10.0 μm and gibsite, i.e., aluminium hydroxide, available under the trade name "hysilite H-42", from Showa Keikinzoku K.K. with an average particle diameter of 1.2 μm were mixed to prepare a cordierite-forming clay formulation. The composition of the above-mentioned components is shown in Table 1, below. These components were mixed so that the formulated clay substantially had the composition by weight on the oxide basis of 51% $SiO_2$, 35% $Al_2O_3$ and 14% MgO.

TABLE 1

| | Components of Clay | | | |
|---|---|---|---|---|
| | Kaolin (%) | Talc (%) | Aluminum hydroxide (%) | Glass (%) |
| $SiO_2$ | 48.08 | 61.16 | 0.02 | 50.96 |
| $Al_2O_3$ | 36.99 | 0.01 | 65.13 | 34.93 |
| CaO | 0.07 | 0.04 | — | 0.08 |
| MgO | 0.03 | 30.01 | — | 13.98 |
| $K_2O$ | 0.05 | — | — | 0.02 |
| $Na_2O$ | 0.07 | — | 0.43 | 0.02 |
| $TiO_2$ | 0.19 | — | — | 0.07 |
| $Fe_2O_3$ | 0.23 | 0.02 | 0.03 | 0.04 |
| IgLoss | 13.97 | 5.07 | 34.45 | — |

1.2 Preparation of Cordierite Glass

MgO having a purity of 99.8%, under the trade name SST-No. 3 of Hotate Kagaku K.K., $Al_2O_3$ having a purity of 99.8%, under the trade name Al-23 of Sumitomo Kagaku K.K., and $SiO_2$ having a purity of 99.7%, under the trade name Silica Q-1 of Kyoritsu Kagaku K.K. were mixed, fused at 1,600° C. for 2 hours in an electrical furnace by flowing a current directly through the mixture, cooled in water and, then, ground to an average particle diameter of 7.0 μm, using a vibration mill with agate balls, so as to prepare powdered glass having a cordierite composition, as shown in the preceding Table 1.

2.1 Mixing Rate of Cordierite Glass to Cordierite-Forming Clay Formulation

The cordierite-forming clay formulation and the cordierite glass which were prepared by the above-mentioned processes 1.1 and 1.2, respectively, were mixed so as to form a 30 kg sample used in Nos. 1 through 11 at different mixing rates, as shown in Table 2, below. Each sample comprises the clay formulation and the glass, both having the cordierite composition described above.

Sample Nos. 2 through 10 are prepared in accordance with the present invention, whereas sample Nos. 1 and 11 are listed here as comparatives.

TABLE 2

| | Mixing Rate (wt %) | | Clay | | | Glass | | |
|---|---|---|---|---|---|---|---|---|
| No. | Clay | Glass | Kaolin (kg) | Talc (kg) | Aluminium hydroxide (kg) | MgO (kg) | $Al_2O_3$ (kg) | $SiO_2$ (kg) |
| 1 | 100 | 0 | 12.20 | 11.20 | 6.60 | — | — | — |
| 2 | 90 | 10 | 10.98 | 10.08 | 5.94 | 0.42 | 1.05 | 1.53 |
| 3 | 80 | 20 | 9.76 | 8.96 | 5.28 | 0.84 | 2.10 | 3.06 |
| 4 | 70 | 30 | 8.54 | 7.84 | 4.62 | 1.26 | 3.15 | 4.59 |
| 5 | 60 | 40 | 7.32 | 6.72 | 3.96 | 1.68 | 4.20 | 6.12 |
| 6 | 50 | 50 | 6.10 | 5.60 | 3.30 | 2.10 | 5.25 | 7.65 |
| 7 | 40 | 60 | 4.88 | 4.48 | 2.64 | 2.52 | 6.30 | 9.18 |
| 8 | 30 | 70 | 3.66 | 3.36 | 1.98 | 2.94 | 7.35 | 10.71 |
| 9 | 20 | 80 | 2.44 | 2.24 | 1.32 | 3.36 | 8.40 | 12.24 |
| 10 | 10 | 90 | 1.22 | 1.12 | 0.66 | 3.78 | 9.45 | 13.77 |
| 11 | 0 | 100 | — | — | — | 4.20 | 10.50 | 15.30 |

1.3 Preparation and Mixing of Calcined Cordierite-Forming Clay (Comparatives)

The cordierite-forming clay formulation obtained by the above-mentioned process 1.1 was calcined at 1,200° C. for 2 hours. The resulting calcined clay was mixed with the cordierite-forming clay formulation so as to form a 30 kg sample used in Nos. 12 through 16 at different mixing rates, as shown in Table 3, below.

TABLE 3

| | Mixing Rate (wt %) | | Clay | | | |
|---|---|---|---|---|---|---|
| No. | Clay | Calcined Clay | Kaolin (kg) | Talc (kg) | Aluminum hydroxide (kg) | Calcined Clay (kg) |
| 12 | 90 | 10 | 10.98 | 10.08 | 5.94 | 3 |
| 13 | 80 | 20 | 9.76 | 8.96 | 5.28 | 6 |
| 14 | 70 | 30 | 8.54 | 7.84 | 4.62 | 9 |
| 15 | 60 | 40 | 7.32 | 6.72 | 3.96 | 12 |
| 16 | 50 | 50 | 6.10 | 5.60 | 3.30 | 15 |

2.2 Preparation of Monolithic Honeycomb Cordierite Ceramic Bodies

A 3 kg sample of any one of Nos. 1 through 16 was mixed for 30 minutes in a mixer, and 8 l of water and 1.8 kg of methyl cellulose were gradually added therewith while mixing was continued further for 30 minutes. Each sample was blended and extruded so as to form 20 monolithic honeycomb cylinders about 4 inches in diameter having 300 cells per square inch, the thickness of the cell wall and the cell pitch being 0.3 mm and 1.47 mm, respectively. The honeycomb green bodies were dried at about 120° C. for 30 minutes and cut to have a height of about 3 inches, as shown in FIG. 1. The green bodies were sintered at 1,430° C. for 3 hours, while the total firing continued for about 100 hours.

3. Evaluation

3.1 Mouldability of Green Bodies

The green bodies were visually examined after moulding. The marks ○, Δ and X denoted in Table 4 indicate the following.

○ . . . Good
Δ . . . A part of the surface layer peeled off
X . . . The whole surface layer cracked or peeled off.

As the green bodies of Sample Nos. 10 and 11 could not be shaped, 0.9 kg of a binder and 0.8 l of water were further added to the compound of Sample Nos. 10 and 11 and mixing, blending and moulding were repeated, so as to prepare Sample Nos. 10' and 11'.

The mouldability of Sample Nos. 2 through 10 and 10' prepared in accordance with the present invention and that of Sample Nos. 1, 11, 11' and 12 through 16 as comparatives are shown in Table 4, below.

TABLE 4

| | | Sintering | | |
|---|---|---|---|---|
| No. | Mouldability | Rate of Contraction (%) | Number of Cracked Samples (/20) | Yield (%) |
| 1 | ○ | 4.7 | 5 | 75 |
| 2 | ○ | 3.8 | 3 | 85 |
| 3 | ○ | 3.1 | 1 | 95 |
| 4 | ○ | 2.4 | 0 | 100 |
| 5 | ○ | 1.8 | 0 | 100 |
| 6 | ○ | 1.3 | 0 | 100 |
| 7 | ○ | 1.1 | 0 | 100 |
| 8 | ○ | 1.0 | 0 | 100 |
| 9 | Δ | 1.0 | 0 | 100 |
| 10 | X | — | — | — |
| 11 | X | — | — | — |
| 10' | Δ | 1.2 | 0 | 100 |
| 11' | Δ | 1.2 | 0 | 100 |
| 12 | ○ | 3.9 | 3 | 85 |
| 13 | ○ | 3.3 | 1 | 95 |
| 14 | ○ | 2.7 | 0 | 100 |
| 15 | ○ | 2.2 | 0 | 100 |
| 16 | ○ | 1.8 | 0 | 100 |

3.2 Rate of Contraction

Figure 2:
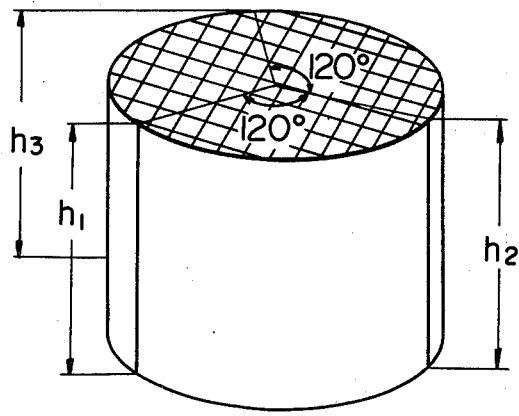
FIG. 2 is a perspective view of a honeycomb ceramic sample, illustrating the portion where the rate of contraction is to be measured.

The heights $h_1$, $h_2$ and $h_3$ of a monolithic honeycomb cylinder were measured along the three lines, which equally divide the periphery of the cylinder, as shown in FIG. 2, before and after the sintering. The rate of contraction was calculated by the following equation:

$$\text{Rate of Contraction} = \frac{h_b - h_a}{h_b} \times 100 \, (\%)$$

wherein $h_b$ is the height before sintering and $h_a$ is the height after sintering.

3.3 Number of Cracked Samples

This number denotes cracked samples per 20 samples, after sintering.

The results of the rate of contraction and the number of cracked samples are shown in the preceding Table 4.

3.4 Compression Strength

Figure 3:
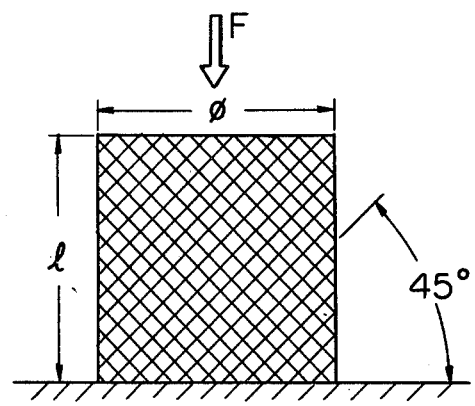
FIG. 3 is a sectional view of a honeycomb ceramic sample, illustrating the direction of the compressing force.

Ten honeycomb green bodies of each sample were prepared by cutting the monolithic green cylinder, as shown in FIG. 2, so as to form another monolithic cylinder 1 inch in diameter φ and 1 inch in length l having the cell walls inclined at 45° angles against the top and bottom circular planes of the thus formed new cylinder, as shown in FIG. 3. A compressing force F is applied perpendicularly on the top circular plane, i.e., in the direction where the honeycomb bodies have the lowest compression strength. The test was carried out on 10 bodies, and the average compression strength is shown in the following Table 5.

3.5 Thermal Expansion Coefficient

Figure 4A:
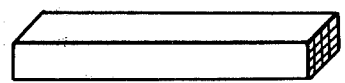
FIGS. 4a through 4c are perspective views of honeycomb ceramic samples, illustrating the directions of extrusion and thermal expansion to be measured.
Figure 4B:
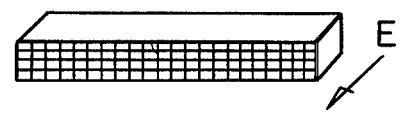
Figure 4C:

Thermal expansion coefficients were determined in three directions of the monolithic honeycomb ceramic bodies. As shown in FIG. 4 (a), the direction P is parallel to the extrusion direction E; in 4 (b), the direction R is rectangular to the direction E; and in 4 (c), the direction L is rectangular to the laminated planes of the cell wall. The three types of sample pieces (a), (b) and (c) have the same size of 6×6×50 mm, although the directions of the planes of the cell wall to the longitudinal axis of the sample pieces are different. The sample piece (c) was prepared as follows. An extruded honeycomb green body was pressed in the direction R (the diagonal direction of the cell) so that the planes of the cell wall were tightened with each other to form a block of laminated planes of the cell wall. The resulting block was dried at about 120° C. for 30 minutes in a highly humid atmosphere and cut to form a sample piece (c) of the above-mentioned size and, then, sintered in a similar way as in the case of the other sample pieces (a) and (b).

The thermal expansion coefficients were determined and averaged over the temperature range of from 25° to 1,000° C.

3.6 Thermal Shock Resistance

The thermal shock resistance of the monolithic honeycomb ceramic cylinder was determined using a gas-fueled tester which is capable of repeating cycles of rapid heating up to 800° C. for 10 minutes and forced cooling with air for 10 minutes. The appearance of cracks was checked with the naked eye, every after 20 cycles of repeated heating and cooling.

The compression strength, thermal expansion coefficient and thermal shock resistance of the cordierite monolithic honeycomb ceramic bodies, Sample Nos. 2 through 9 and 10' prepared in accordance with the present invention and Sample Nos. 1, 11' and 12 through 16 as comparatives, are shown in Table 5, below.

TABLE 5

| No. | Compression Strength (kg/cm$^2$) | Thermal Expansion Coefficient ($\times 10^{-6}$/°C.) | | | Thermal Shock Resistance Cycles (up to 800° C.) |
| --- | --- | --- | --- | --- | --- |
| | | P | R | L | |
| 1 | 7.6 | 0.85 | 0.97 | 1.92 | 100~120 |
| 2 | 7.4 | 0.90 | 1.01 | 1.70 | 140~160 |
| 3 | 8.0 | 0.96 | 1.03 | 1.41 | 180~220 |
| 4 | 8.7 | 1.03 | 1.07 | 1.18 | 300~320 |
| 5 | 8.9 | 1.08 | 1.09 | 1.10 | 340~360 |
| 6 | 9.0 | 1.10 | 1.11 | 1.10 | 380~400 |
| 7 | 8.7 | 1.11 | 1.10 | 1.12 | 360~380 |
| 8 | 8.7 | 1.13 | 1.10 | 1.10 | 320~340 |
| 9 | 7.3 | 1.12 | 1.12 | 1.13 | 200~220 |
| 10' | 6.0 | 1.14 | 1.15 | 1.14 | 160~180 |
| 11' | 5.1 | 1.15 | 1.14 | 1.17 | 140~160 |
| 12 | 7.4 | 1.10 | 1.20 | 1.93 | 80~100 |
| 13 | 7.1 | 1.21 | 1.31 | 1.90 | 80~100 |
| 14 | 6.9 | 1.27 | 1.37 | 1.86 | 60~80 |
| 15 | 7.3 | 1.32 | 1.40 | 1.84 | 60~80 |
| 16 | 7.0 | 1.40 | 1.50 | 1.81 | 40~60 |

APPLICABILITY IN INDUSTRY

The present invention provides a process for producing a cordierite ceramic product which has a substantially isotropic and low thermal expansion coefficient and, thus, an improved thermal shock resistance, particularly a durable resistance against repeated cycles of rapid heating and cooling, which is useful as a carrier having a catalyst for purifying exhaust of automobiles, and also in other various usages.

We claim:

1. In a process for producing a cordierite ceramic product comprising the steps of blending the starting cordierite composition, molding the blended composition, and drying and sintering the molded composition, the improvement comprising using as the starting cordierite composition a composition comprising:
   (a) a clay formulation having a cordierite composition comprising kaolin, talc, and aluminum oxide and/or an aluminum compound which is convertible into aluminum oxide;
   (b) a glass having a cordierite composition present in an amout of from about 10% to about 90% by weight, based on the total weight of said components (a) and (b);
   (c) from about 3% to about 8% by weight of an organic binder based upon the total weight of the starting cordierite composition; and
   (d) from about 18% to about 23% by weight of water based on the total weight of the starting cordierite composition.

2. The process according to claim 1 in which component (b), glass, is present in an amount from about 30% to 70% by weight, based on the total weight of said components (a) and (b).

3. The process according to claim 1 or 2 in which the molding is carried out by extrusion, the resulting cordierite ceramic product has a monolithic honeycomb structure, and the difference between the expansion coefficients of said cordierite ceramic product, measured over the range of from 25° C. to 1000° C., in three directions which are rectangular to each other, is less than $0.2 \times 10^{-6}$/°C., said directions being a direction (A) of extrusion, a direction (B) in the thickness of the plane of one web of said honeycomb structure, and a direction (C) rectangular to both said directions (A) and (B).

* * * * *